Figure 1:
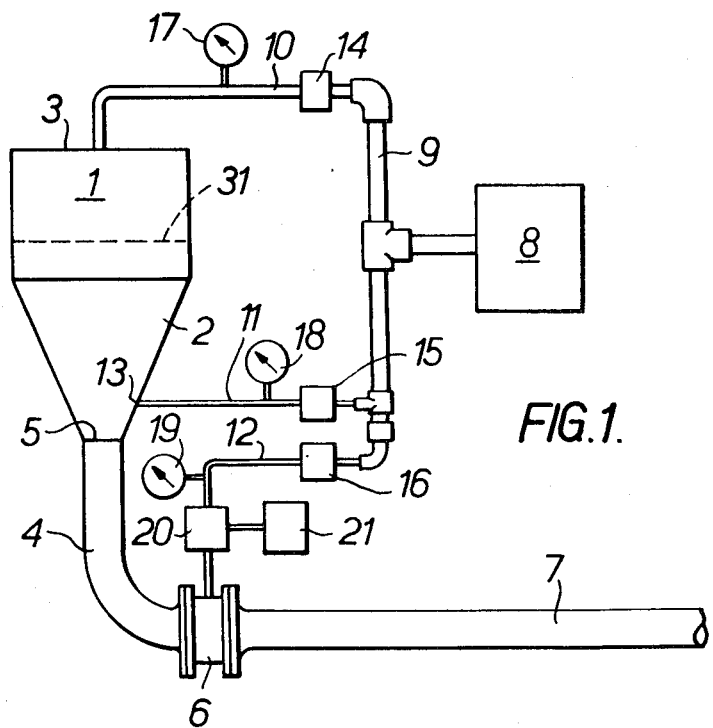

United States Patent

[11] 3,604,758

[72] Inventors Robert James Flain;
Brian Stanley Mawson, both of Stevenage, England
[21] Appl. No. 862,407
[22] Filed Sept. 30, 1969
[45] Patented Sept. 14, 1971
[73] Assignee National Research Development Corporation
London, England
[32] Priority Oct. 2, 1968
[33] Great Britain
[31] 46814/68

[54] APPARATUS FOR THE CONVEYANCE OF COHESIVE PARTICULATE MATERIAL
12 Claims, 2 Drawing Figs.
[52] U.S. Cl. .................................................. 302/24, 302/53, 302/26
[51] Int. Cl. .................................................. B65g 53/04
[50] Field of Search .......................................... 302/24, 26, 41, 53; 222/56, 196, 193

[56] References Cited
UNITED STATES PATENTS
2,274,708  3/1942  Kennedy .................. 302/53
3,380,780  4/1968  Allen et al. ............... 302/26

*Primary Examiner*—Andres H. Nielsen
*Attorney*—Cushman, Darby & Cushman

ABSTRACT: A method of piping cohesive particulate materials, to a delivery point, via a delivery pipe, from a mass flow hopper, the exit from which is too small for the hopper to empty by gravity alone, which comprises introducing gas under pressure into the space above the material in the hopper, introducing gas to the hopper at a point near but somewhat above the exit orifice in quantity insufficient to aerate the particulate material beyond the dense phase (i.e. not less than about 250:1 solid: gas mass ratio) and intermittently introducing gas into the delivery pipe at a point near to but somewhat beyond the junction of that pipe with the hopper exit orifice, to divide the particulate material in the pipe into discrete plugs.

Apparatus for the method may have an electrical oscillator for controlling the intermittent gas introduction into a jacket surrounding a short porous section of the pipe wall.

APPARATUS FOR THE CONVEYANCE OF COHESIVE PARTICULATE MATERIAL

This invention relates to the transfer from one place to another of cohesive particulate materials.

Various systems are known for piping particulate materials from place to place by means which involve fluidization or at least substantial aeration of the material but this involves high volume flows of the gaseous fluidizing or aerating medium and measures have to be taken to deaerate the material at the delivery point. Furthermore it is not easy to fluidize highly cohesive materials.

The present invention is concerned with the conveyance of cohesive particulate material in what is commonly called the "dense phase" in which the mass ratio solid/gas is of the order of 250 to 400.

It is known to dispense such materials from what is commonly known as a "Mass Flow Hopper." Such a hopper has downwardly convergent walls the angle of which can be calculated by known means and is dependent on the mutual coefficient of friction between any particular material to be handled and the material of the surfaces of the convergent walls with which the material to be handled comes into contact. The higher this coefficient the smaller must be the included angle of the convergent walls to avoid the formation of a vertical tunnel down the material to be handled, surrounded by a volume of such material which remains in the hopper. Having determined the said angle, the size of the delivery orifice to which the walls must converge is dependent upon a characteristic of the particulate material to be handled, which is commonly termed the "strength of a free surface." This characteristic reflects the cohesive qualities of the particulate material, and thus tendency to form a bridge across the outlet orifice of the hopper. The higher the "strength at a free surface" the larger the outlet orifice must be, and the more bulky the hopper as a whole, to inhibit bridging.

Where it is desired to convey materials from a mass flow hopper via a pipe of convenient dimensions to a delivery point, the diameter of this pipe virtually determines the size of the outlet orifice of the mass flow hopper and this, for most cohesive materials, is substantially smaller than it would have to be to avoid bridging.

To drive the cohesive material through such a pipe, force has to be applied at some point in the system and it is proposed to apply this force in the form of pressurized gas introduced above the material in the hopper. By itself this, if anything aggravates the tendency to bridging of the material in the hopper. It has been found that this tendency to bridging on the part of the material can be obviated by introducing into the lower regions of the hopper a relatively small amount of pressurized gas which is insufficient to lower the solid/gas mass ratio below the "dense phase" range above explained.

It is still necessary to obviate the tendency of the particulate material to jam in the delivery pipe.

In pressure required to drive a given particulate material along a pipe of given diameter varies as the square of the continuous length of material in the pipe and can rise to wholly uneconomic levels. It is proposed to overcome this difficulty by dividing the material in the pipe into discrete lengths or plugs which have gas-filled gaps between them, this being known per se but in the context of cumbersome expedients for delivering the material to the plug-forming location.

To summarize, the inventive solution of these problems comprises a method for transferring cohesive particulate materials along a delivery pipe from a mass flow hopper with an outlet orifice too small to obviate bridging of material in the hopper when propelled by gravity alone, introducing pressurized gas into the hopper above the material contained therein, introducing pressurized gas into the hopper at a point near to the outlet and introducing pressurized gas intermittently into a delivery pipe connected to the outlet of the hopper at a point close to but spaced away from the junction of the delivery pipe with the outlet of the hopper.

Preferably the rate of gas flow into the top of the hopper is equal to the rate of transport of material along the pipeline whilst the rate of gas flow into the lower part of the hopper is of the order of one-fourth of the material transport rate.

Preferably the average rate of flow of gas into the said introduction point in the pipeline is a fraction of the material transport rate equal to the desired ratio of the airgaps between plugs and the length of each plug of material passing along the pipe. This ratio may be of the order of 1:5 for a considerable range of cohesive particulate materials suitable for transport by apparatus according to the invention.

Preferably the point of entry of gas into the lower part of the hopper is located at a distance above the hopper outlet equal to between one-third and one-sixth of the height of the slanted walls of the hopper above the said outlet.

The invention also comprises apparatus for performing this method.

Figure 2:
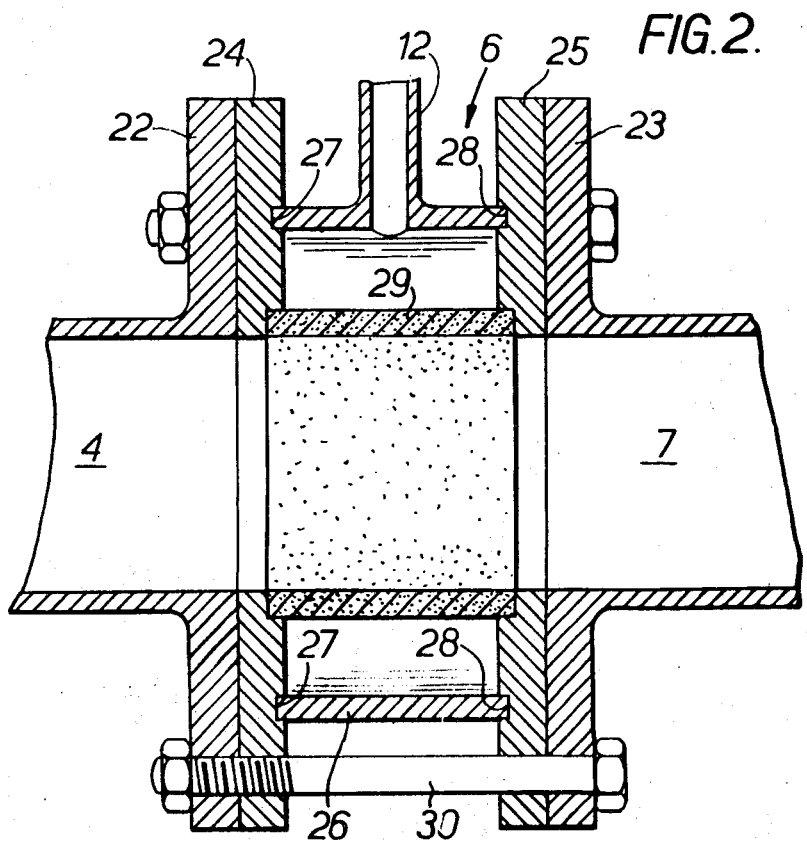

The invention will be more readily understood from the following description of an embodiment thereof illustrated in the accompanying drawings of which:

FIG. 1 is a somewhat diagrammatic representation of apparatus according to the invention, and FIG. 2 is a sectional view of the means for introducing gas into the pipe.

In FIG. 1 a hopper 1 has a lower tapered portion 2 the taper angle of which is that of a mass flow hopper for the material to be conveyed by the apparatus.

The top of hopper 1 is closed with a lid 3 which is detachable for recharging the hopper but which when closed is an airtight fit onto the body of the hopper. The securing and sealing means are conventional and are not shown in the drawing.

The lower end of the tapered hopper portion 2 is joined to a short curved length of pipe 4, both pipe 4 and the exit orifice 5 of the hopper being smaller than the size of hopper exit orifice necessary for the material in question to flow freely from the hopper without bridging.

The other end of curved pipe 4 is connected via a gas introduction device 6 to a further length of pipe 7, which extends to the delivery point (not shown).

A source 8 of pressurized gas supplies a branched pipe 9 which divides the flow into separate streams flowing through pipes 10, 11 and 12 to the top of the hopper 1, to a point 13 near the exit orifice 5 and to the gas introduction device 6, respectively. The pipes 10, 11 and 12 could be supplied with pressurized gas from separate sources, of course.

Flow regulator devices 14, 15 and 16 are inserted in pipes 10, 11 and 12 respectively and pressure-measuring devices 17, 18 and 19 are connected respectively to the said pipes.

Gas introduction device 6 is supplied with gas from pipe 12 via a solenoid valve 20 which is controlled by an electric pulse generator 21.

Gas introduction device 6 is shown in detail in FIG. 2. The end of pipes 4 and 7 have integral flanges 22 and 23 and device 6 has annular end plates 24 and 25 of the same size as these flanges. These end plates 24 and 25 are spaced apart by a tubular section 26 which is shown as being received in grooves 27 and 28 of end plates 24 and 25. Pipe 12 is welded to tubular section 26 which is pierced in alignment with the bore of pipe 12.

The inner corners of plates 24 and 25 are recessed to receive an inner porous liner 29 which may be of sintered bronze.

Bolts such as 30 pass through flanges 22 and 23 and end plates 24 and 25 to secure the assembly and hold tubular section 26 and porous liner 29 in their respective grooves and recesses which are preferably lined with resilient sealing material. Alternatively end plates 24 and 25 and tubular section 26 and liner 29 may all be welded together enabling individual short bolts to be used to secure flange 22 to end plate 24 and flange 23 to end plate 25.

The apparatus functions as follows:

Pressure source 8 delivers gas at a pressure which may be of the order of 6 to 10 lbs. per square inch. This pressure is applied via pipe 10 to the top, (indicated by dotted line 31 in FIG. 1) of the material contained in hopper 1 which is forced downwards.

The same pressure is applied to pipe 11 leading to point 13 of hopper 1. The entry of gas at point 13 may be radial or partly tangential or by means of an inner aeration ring. This gas entering at point 13 is small in quantity and flow regulator 15 is adjusted to restrict the flow appropriately. It should be understood that the purpose of introducing gas at point 13 is to break down the bridge of particulate material which would otherwise form above the exit orifice 5 of the hopper due to the relatively small size of that orifice. It is not desirable to introduce into the particulate material more than the bare minimum of gas necessary to prevent bridging. The invention aims to convey the material in the dense phase so that a satisfactory mass flow to the delivery point can be achieved without the high flow velocities associated with highly aerated material and without the necessity of cyclones or the like at the delivery point, to separate the gas from the particulate material. The flow through pipe 11 is only about one-fourth of the flow through pipe 10. As the particulate material passes into the curved tube 4 some compaction occurs due to the driving pressure applied via pipe 10. When the particulate material passes through gas introduction device it is periodically subjected to a pulse of gas flow brought about by the periodical opening of valve 20 under control of pulse generator 21. This separates the material into discrete plugs separated by gas-filled gaps. The length of each plug is a function of the flow rate of the material past device 6 and the frequency of the pulses from pulse generator 21. The duration of each pulse governs the lengths of the gas-filled gaps between the plugs. The optimum lengths of the plugs depends upon the nature of the particulate material to be conveyed. As previously indicated, the pressure required to drive a particular material along a pipe of given diameter varies as the square of the length of uninterrupted material in the pipe and, having chosen a convenient driving pressure there will be a maximum length of plug which can be driven by this pressure. There is of course a falling off of the pressure in successive gaps between plugs along the length of the delivery pipe towards the delivery point and the effective driving pressure for the purpose of determining the optimum length of plug is the pressure existing in the gap behind the last complete plug adjacent to the delivery point.

For satisfactory conveyance of cohesive particulate material in the dense phase the lengths of the plugs must be short and it has been found that a plug 1 foot in length of calcite requires only a pressure of the order of 0.7 lbs. per square inch to move it from rest and a pressure of only about one-third of this to maintain it in motion. This explains the fact that the plugs towards the delivery end of pipe 7 can be kept in motion despite the fact that the pressure in the gaps between such plugs has fallen from the initial pressure at device 6, to a pressure not very much above atmospheric pressure towards the delivery end of pipe 7.

The distance of the device 6 from the hopper outlet needs to be within a certain range which can be ascertained by trial and error. If the distance is too short a satisfactory plug cannot be formed and if it is too long an excessive pressure is required to drive the plugs along pipe 7. Pipe joints must be very smooth otherwise the plugs break up on passing through the joint.

A typical timing for the operation of valve 20 is 1:1 open: closed ratio with a frequency of 1 cycle per second. The gas from source 8 will generally be air.

The apparatus illustrated in the drawings is adapted for batchwise operation. When the hopper becomes empty the pressure drop along pipe 7 suddenly drops and the gas flow increases dramatically. This high velocity gas flow sweeps out the powder from the pipeline leaving only a small residual dust layer on the inner surface of the pipeline. It is then possible to pass a different material subsequently through the apparatus with only minimal initial contamination by the material previously passed through the apparatus.

In starting up the apparatus after charging the hopper, it is preferable to set the flow regulators 14, 15 and 16 to appropriate settings and then to apply pressured gas at full pressure immediately from source 8 to pipe 9. A rapid buildup of pressure takes place in the three gas inlet points and transport starts instantaneously.

Examples of the performance of apparatus according to the invention are as follows:

Example I

| Material | calcite "as delivered," 66 micron |
|---|---|
| Pipe 7 length | feet |
| Vertical lift | 11 feet |
| Hopper pressure (pipe 10) | 8 lbs. per sq. in. |
| Valve 20 timing | 0.5 sec. open/0.5 sec. closed |
| Powder rate | 115 lbs. per minute |
| Air rate | 5.55 cu. ft. per minute |
| Volume ratio, air: powder | 2.15 |
| Mass ratio, powder: air | 345 |
| Useful work done | 1,700 ft. lb. per minute |
| Adiabatic air H.P. | 0.159 |

Example II

| Material | calcite "as delivered," 66 micron |
|---|---|
| Pipe 7 length | 30 feet |
| Vertical lift | 22 feet |
| Hopper pressure (pipe 10) | 8.5 lbs. per sq. in. |
| Valve 20 timing | 0.5 sec. open/0.5 sec. closed |
| Powder rate | 32.6 lbs. per minute |
| Air rate | 1.6 cu. ft. per minute |
| Volume ratio, air: powder | 2.94 |
| Mass ratio, powder: air | 250 |
| Useful work done | 716 ft. lb. per minute |
| Adiabatic air H.P. | 0.05 |

Example III

| Material | Portland cement |
|---|---|
| Pipe 7 length | 25 feet |
| Vertical lift | 11 feet |
| Hopper pressure | 7 lbs. 0.5 sq. in. |
| Valve 20 timing | 0.5 sec. open/0.5 sec. closed |
| Powder rate | 208 lbs. per minute |
| Air rate | 6.35 cu. ft. per minute |
| Volume ratio, air: powder | 2.2 |
| Mass ratio, powder: air | 400 |
| Useful work done | 2,290 ft. lbs. per minute |
| Adiabatic air H.P. | 0.156 |

The apparatus used in the above examples was a relatively small-scale experimental model having a hopper 18 inches in diameter, with an upper cylindrical section 2 ft. 6 inches in height and a lower conical section 2 ft. 6 inches in height, with a capacity of 300 lbs. of powder. The lid 3 was fixed with quick release toggle bolts. The internal diameter of pipes 4 and 7 was 2 inches. The pipe 11 at the point 13 was one-sixteenth inch in internal diameter.

We claim:
1. A method of transferring cohesive particulate materials from a hopper along a delivery pipe to a delivery point, the hopper being a mass flow hopper with an outlet orifice too small to obviate bridging of the material in the hopper when propelled by gravity alone, with pressurized gas introduced above the level of the material in the hopper to propel particulate material out of the hopper and along the delivery pipe and with pressurized gas introduced into the hopper at a point near the outlet orifice at a volume flow rate substantially less than the volume flow delivery rate of the particulate material from the hopper, pressurized gas being also introduced intermittently, at an average volume flow rate which is substantially less than the average volume flow rate of particular material through the delivery pipe, into the delivery pipe at a point close to but spaced away from the junction of the delivery pipe and the outlet orifice of the hopper to separate the material in the delivery pipe into discrete plugs.

2. The method according to claim 1 characterized in that the point near the outlet orifice of the hopper at which gas under pressure is introduced, is situated an amount above the outlet orifice between one-third and one-sixth of the height above the outlet orifice of the top of the slanted walls of the hopper.

3. The method according to claim 1 in which the average rate of flow of the gas introduced intermittently with the delivery pipe is of the order of one-fifth of the average transport rate of the particulate material through the delivery pipe.

4. The method according to claim 1 characterized in that the gas intermittently introduced into the delivery pipe is delivered with an on-off time ratio of approximately 1:1 and a cycle frequency of 1 cycle per second.

5. The method according to claim 1 characterized in that the flow rate of the gas under pressure introduced into the space above the surface of the particulate material in the hopper is regulated so that it is equal to the flow rate of the material from the hopper.

6. The method according to claim 1 in which the flow rate of the gas introduced into the hopper at a point near the outlet orifice is not greater than one-fourth of the rate of transport of the particular material along the delivery pipe.

7. Apparatus for conveying cohesive particulate materials from storage means to a remote delivery point characterized by a mass flow hopper, as the storage means, having an exit orifice too small to obviate bridging of the material when propelled by gravity alone, a delivery pipe connected to the said exit orifice means and leading to the delivery point, means for applying gas under pressure to the surface of the material in the hopper with a flow rate equal to the transport rate of the material from the hopper, means for introducing gas under pressure into the hopper at a point neat to the outlet orifice and for regulating the flow rate so that it does not exceed one-fourth of the transport rate of the material from the hopper and means for intermittently introducing pressurized gas into the delivery pipe at a point near to but spaced away from the junction thereof with the outlet orifice of the hopper whereby the particulate material in the delivery pipe is divided into discrete plugs separated by gas-filled spaces.

8. Apparatus according to claim 7 in which the hopper has a lower part with walls slanting inwardly towards the outlet orifice characterized in that the said point near the outlet orifice for introduction of gas under pressure into the hopper, is spaced from the outlet orifice by an amount between one-third and one-sixth of the overall height of the said lower part of the hopper.

9. Apparatus according to claim 7 characterized in that pressurized gas is intermittently introduced into the delivery pipe through a valve which is controlled to open and shut cyclically by an oscillator.

10. Apparatus according to claim 9 characterized in that the oscillator is an electronic oscillator.

11. Apparatus according to claim 7 characterized in that the delivery pipe has a short length of its wall in the form of a gas-permeable sleeve with a jacket surrounding the said short length of pipe wall and with an air entry port in the jacket coupled to a source of intermittent pulses of pressurized gas.

12. Apparatus for conveying cohesive particulate materials from storage means to a remote delivery point, characterized by:

a mass flow hopper as the storage means;

an exit aperture for the mass flow hopper which is too small to obviate bridging of the particulate material when propelled by gravity alone;

a delivery pipe connected to the said exit orifice and leading to a delivery point;

means for applying gas under pressure to the surface of the material in the hopper;

means for regulating the volume flow rate of the said gas applied to the surface of the material in the hopper so that it is substantially equal to the volume flow rate of material down the hopper;

means for introducing gas under pressure into the hopper at a point near to the outlet orifice;

means for regulating the volume flow rate of the said gas introduced at the point near to the hopper outlet orifice so that it does not exceed one-fourth of the volume flow rate of material down the hopper;

air introduction means comprising gas introduction paths distributed around the circumference of the delivery pipe at a location along such pipe which is near to but spaced away from the junction thereof with the hopper outlet orifice such paths communicating with the interior of the pipe;

means for intermittently supplying gas under pressure to the gas introduction paths whereby the particulate material in the delivery pipe is divided into discrete plugs separated by gas-filled spaces; and means for regulating the average volume flow rate of the gas supplied to the said introduction paths so that it is of the order of one-fifth of the average volume flow rate of particulate material through the delivery pipe.